(12) United States Patent
Hirata et al.

(10) Patent No.: US 12,070,961 B2
(45) Date of Patent: Aug. 27, 2024

(54) THREE-DIMENSIONAL OBJECT PRINTER

(71) Applicant: Seiko Epson Corporation, Tokyo (JP)

(72) Inventors: Koki Hirata, Nagano (JP); Keigo Sugai, Chino (JP); Yuki Ishii, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 163 days.

(21) Appl. No.: 17/695,939

(22) Filed: Mar. 16, 2022

(65) Prior Publication Data

US 2022/0297444 A1 Sep. 22, 2022

(30) Foreign Application Priority Data

Mar. 17, 2021 (JP) ................................ 2021-043200

(51) Int. Cl.
| | |
|---|---|
| *B41J 3/407* | (2006.01) |
| *B41J 25/316* | (2006.01) |
| *B41J 29/38* | (2006.01) |
| *B25J 11/00* | (2006.01) |
| *B25J 13/08* | (2006.01) |

(52) U.S. Cl.
CPC ........... *B41J 3/4073* (2013.01); *B41J 25/316* (2013.01); *B41J 29/38* (2013.01); *B25J 11/0075* (2013.01); *B25J 13/086* (2013.01)

(58) Field of Classification Search
CPC .. B41J 2/04526; B41J 2/04586; B41J 3/4073; B41J 25/316; B41J 29/38; B05C 5/00; B25J 11/0075; B25J 13/086
See application file for complete search history.

(56) References Cited

U.S. PATENT DOCUMENTS

| | | | |
|---|---|---|---|
| 10,940,691 B2* | 3/2021 | Daniels | .................. B41J 25/308 |
| 2014/0063096 A1 | 3/2014 | Pitz et al. | |
| 2016/0136950 A1 | 5/2016 | Date | |

FOREIGN PATENT DOCUMENTS

| | | |
|---|---|---|
| JP | 2014-050832 A | 3/2014 |
| JP | 2016-093973 A | 5/2016 |

* cited by examiner

*Primary Examiner* — Thinh H Nguyen
(74) *Attorney, Agent, or Firm* — Harness, Dickey & Pierce, P.L.C.

(57) ABSTRACT

A three-dimensional object printer includes a head having a plurality of nozzles that discharge a liquid, a movement mechanism having an arm section that supports the head and having a plurality of joint sections provided on the arm section, a drive circuit that generates a drive signal to drive the head, a control circuit that generates a control signal to control supply of the drive signal to the head, a first cable for transmitting the drive signal from the drive circuit to the head, and a second cable for transmitting the control signal from the control circuit to the head. At least a part of the second cable is arranged along the arm section. The control signal is transmitted as a differential signal to the second cable.

19 Claims, 4 Drawing Sheets

THREE-DIMENSIONAL OBJECT PRINTER

The present application is based on, and claims priority from JP Application Serial Number 2021-043200, filed Mar. 17, 2021, the disclosure of which is hereby incorporated by reference herein in its entirety.

BACKGROUND

1. Technical Field

The present disclosure relates to a three-dimensional object printer.

2. Related Art

There has been known a three-dimensional object printer that performs ink jet printing on the surface of a three-dimensional workpiece. For example, a device described in JP-A-2014-050832 includes a robot arm and a print head fixed to the tip of the robot arm, and prints an image on an object with ink from the print head.

In a printer described in JP-A-2014-050832, when a cable for transmitting a signal for controlling the drive of a print head is arranged along a robot arm, electromagnetic force generated from a motor that drives the robot arm or electromagnetic force generated from, for example, wiring coupled to the motor is easily mixed as noise into the signal. This hinders stable driving of the print head in the device described in JP-A-2014-050832, resulting in a problem of image quality degradation.

SUMMARY

A three-dimensional object printer according to an aspect of the present disclosure includes a head having a plurality of nozzles that discharge a liquid, a movement mechanism having an arm section that supports the head and having a plurality of joint sections provided on the arm section, a drive circuit that generates a drive signal to drive the head, a control circuit that generates a control signal to control supply of the drive signal to the head, a first cable for transmitting the drive signal from the drive circuit to the head, and a second cable for transmitting the control signal from the control circuit to the head. At least a part of the second cable is arranged along the arm section, and the control signal is transmitted as a differential signal to the second cable.

DESCRIPTION OF EXEMPLARY EMBODIMENTS

Figure 1:
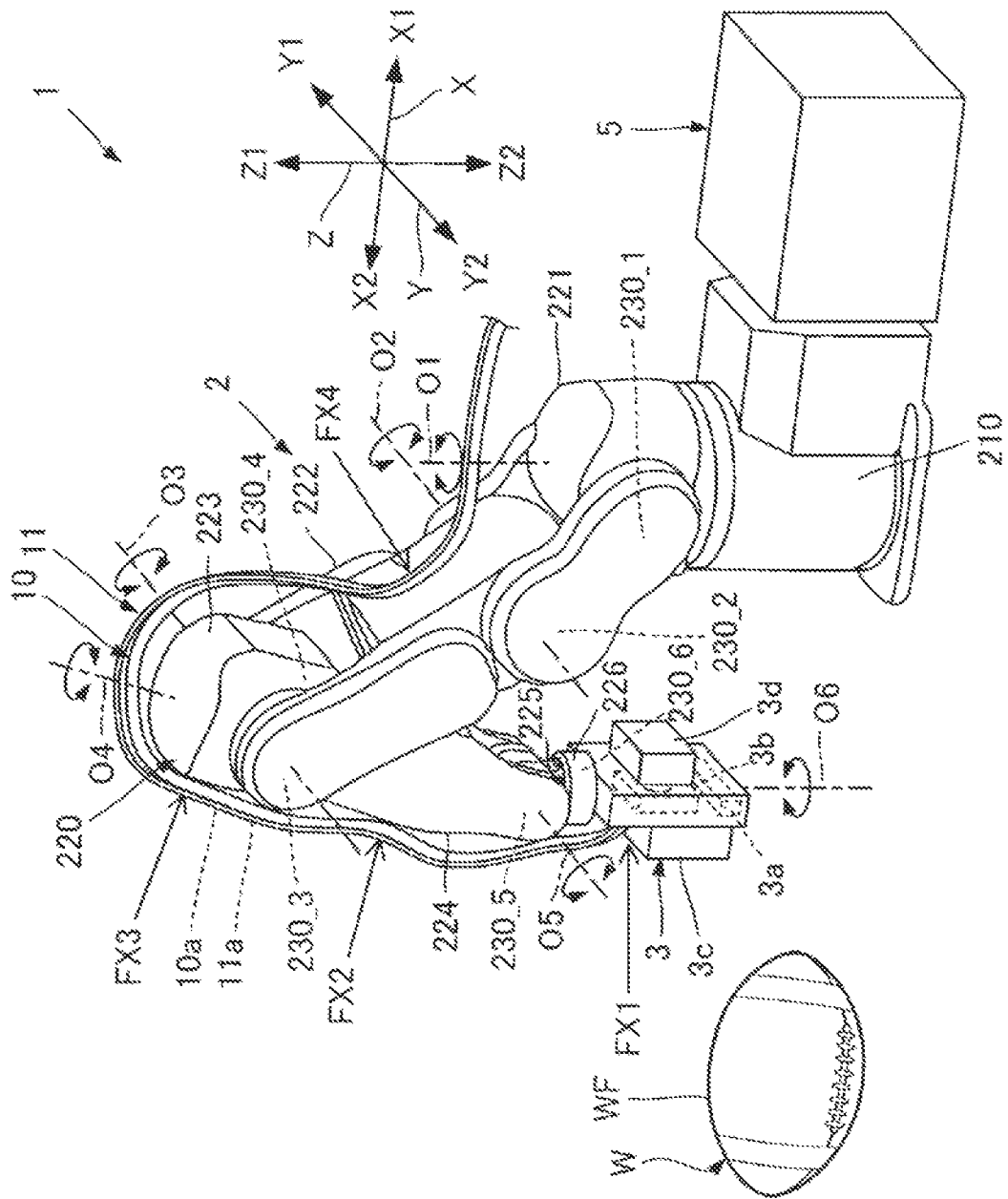
FIG. 1 is a perspective view schematically illustrating a three-dimensional object printer according to an embodiment.

Hereinafter, embodiments according to the present disclosure will be described with reference to the accompanying drawings. In the drawings, the dimensions and scale of each component are appropriately different from the actual ones, and some parts are schematically illustrated for easy understanding. Furthermore, the scope of the present disclosure is not limited to such embodiments unless it is stated in the following description that the present disclosure is particularly limited.

For convenience, the following description will be given appropriately using an X-axis, a Y-axis and a Z-axis that intersect each other. Also, in the following description, one direction along the X-axis is an X1 direction, and a direction opposite to the X1 direction is an X2 direction. Likewise, directions opposite to each other along the Y-axis are a Y1 direction and a Y2 direction. Also, directions opposite to each other along the Z-axis are a Z1 direction and a Z2 direction.

The X-axis, Y-axis, and Z-axis correspond to coordinate axes of a world coordinate system set in a space where a robot 2 to be described later is installed.

Typically, the Z-axis is a vertical axis, and the Z2 direction corresponds to a downward direction in the vertical direction. A base coordinate system based on a position of a base section 210 to be described later of the robot 2 is associated with the world coordinate system by calibration. In the following, for convenience, description is given of a case where the operation of the robot 2 is controlled by using the world coordinate system as a robot coordinate system.

The Z-axis does not have to be the vertical axis. The X-axis, Y-axis, and Z-axis are typically orthogonal to each other. However, the present disclosure is not limited thereto, and the X-axis, Y-axis, and Z-axis are not orthogonal to each other in some cases. For example, the X-axis, Y-axis, and Z-axis may intersect each other at an angle within a range from 80° to 100°.

1. Embodiment

1-1. Overview of Three-Dimensional Object Printer

FIG. 1 is a perspective view schematically illustrating a three-dimensional object printer 1 according to an embodiment. The three-dimensional object printer 1 performs ink jet printing on a surface of a workpiece W having a three-dimensional shape.

The workpiece W has a surface WF on which printing is performed. In the example illustrated in FIG. 1, the workpiece W is a rugby ball having a long spherical shape, and the surface WF is a curved surface. The workpiece W at the time of printing is supported by a structure such as a predetermined installation table, a robot hand, or a conveyor, when necessary. The aspect such as the shape or size of the workpiece W or the surface WF is not limited to the example illustrated in FIG. 1 but may be any size or shape. Likewise, the position or orientation of the workpiece W or the surface WF during printing is not limited to the example illustrated in FIG. 1 but may be any position or orientation that allows for printing.

As illustrated in FIG. 1, the three-dimensional object printer 1 includes the robot 2 as an example of "movement mechanism", a head unit 3, a controller 5, a piping section 10, and a wiring section 11. First, these components will be briefly described below in order.

The robot 2 is a robot that changes a position and a posture of the head unit 3 in the world coordinate system. In the example illustrated in FIG. 1, the robot 2 is a so-called 6-axis vertical articulated robot.

As illustrated in FIG. 1, the robot 2 has the base section 210 and an arm section 220.

The base section 210 is a table that supports the arm section 220. In the example illustrated in FIG. 1, the base section 210 is fixed by screwing or the like to an installation surface such as a floor surface facing the Z1 direction. The installation surface to which the base section 210 is fixed may be a surface facing in any direction, and is not limited to the example illustrated in FIG. 1 but may be, for example, a surface of a wall, a ceiling, a movable trolley, or the like.

The arm section 220 is a 6-axis robot arm having a base end attached to the base section 210 and a tip that changes its position and posture three-dimensionally with respect to the base end. To be more specific, the arm section 220 has arms 221, 222, 223, 224, 225, and 226, which are coupled in this order.

The arm 221 is rotatably coupled to the base section 210 around a rotation axis O1 via a joint section 230_1. The arm 222 is rotatably coupled to the arm 221 around a rotation axis O2 via a joint section 230_2. The arm 223 is rotatably coupled to the arm 222 around a rotation axis O3 via a joint section 230_3. The arm 224 is rotatably coupled to the arm 223 around the rotation axis O4 via the joint section 230_4.

The arm 225 is rotatably coupled to the arm 224 around a rotation axis O5 via a joint section 230_5. The arm 226 is rotatably coupled to the arm 225 around a rotation axis O6 via a joint section 230_6.

Each of the joint sections 230_1 to 230_6 is a mechanism for rotatably coupling one of two adjacent members among the base section 210 and the arms 221 to 226 to the other. In the following, each of the joint sections 230_1 to 230_6 may be referred to as the "joint section 230".

Although not illustrated in FIG. 1, each of the joint sections 230_1 to 230_6 is provided with a drive mechanism to rotate one of the two corresponding members adjacent to each other with respect to the other. The drive mechanism includes, for example: a motor that generates driving force for the rotation; a speed reducer that decelerates and outputs the driving force; and an encoder such as a rotary encoder that detects an operating amount such as an angle of the rotation. The assembly of the drive mechanisms of the joint sections 230_1 to 230_6 corresponds to an arm drive mechanism 2a illustrated in FIG. 2 to be described later.

The rotation axis O1 is an axis perpendicular to the installation surface (not shown) to which the base section 210 is fixed. The rotation axis O2 is an axis perpendicular to the rotation axis O1. The rotation axis O3 is an axis parallel to the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, "perpendicular" includes not only when the angle formed by any two rotation axes is exactly 90°, but also when the angle formed by any two rotation axes deviates from 90° by about ±5°. Likewise, "parallel" includes not only when any two rotation axes are strictly parallel, but also when one of any two rotation axes is tilted within a range of about ±5° with respect to the other.

The head unit 3 is attached, as an end effector, to the arm 226 located at the tip of the arm section 220 of the robot 2 in a state where the head unit 3 is fixed by screwing or the like.

The head unit 3 is an assembly having a head 3a that discharges ink as an example of "liquid" toward the workpiece W. The head unit 3 includes a plurality of elements. Among the plurality of elements, FIG. 1 illustrates a pressure regulating valve 3b, a curing light source 3c, and a distance sensor 3d, besides the head 3a. The head unit 3 will be described in detail with reference to FIGS. 3 and 4 to be described later.

The ink is not particularly limited, and examples of the ink include an aqueous ink having a coloring material such as a dye or a pigment dissolved in an aqueous solvent, a curable ink using a curable resin such as an ultraviolet curable type, and a solvent-based ink having a coloring material such as a dye or a pigment dissolved in an organic solvent, and the like. Among the above, the curable ink is preferably used. The curable ink is not particularly limited but may be, for example, any of a thermosetting type, a photocurable type, a radiation curable type, an electron beam curable type, and the like. Among the above, the photocurable type such as an ultraviolet curable type is preferable. The ink is not limited to a solution but may be an ink having a coloring material or the like dispersed as a dispersoid in a dispersion medium. Alternatively, the ink is not limited to that containing a coloring material but may be an ink containing conductive particles such as metal particles for forming a wire or the like as a dispersoid, a clear ink, or a treatment liquid for surface treatment of the workpiece W.

The piping section 10 and the wiring section 11 are coupled to the head unit 3, respectively. The piping section 10 is a piping or a piping group including a supply pipe 10a that supplies ink from an ink tank (not shown) to the head unit 3. The supply pipe 10a is a flexible pipe body made of, for example, a rubber material, an elastomer material, or the like. However, in addition to the supply pipe 10a, the piping section 10 may also include other pipes such as a pipe for transferring ink discharged from the head unit 3. On the other hand, the wiring section 11 is a wiring group including a first cable 11a that supplies an electric signal for driving the head 3a. The configuration of the wiring section 11 will be described in detail with reference to FIG. 5 to be described later.

The piping section 10 and the wiring section 11 are fixed to the head unit 3 at a fixing position FX1 by coupling to the head unit 3. The fixing position FX1 is a position inside the end effector, specifically, a position of a connector (not shown) for coupling the piping section 10 and the wiring section 11 to the head unit 3. The piping section 10 and the wiring section 11 are also fixed to the arm section 220 of the robot 2 described above by a binding band or the like at fixing positions FX2, FX3, and FX4. The fixing position FX2 is a position on the arm 224 described above. The fixing position FX3 is a position on the arm 223 described above. The fixed position FX4 is a position on the arm 222 described above. By partially fixing the piping section 10 and the wiring section 11 at the plurality of positions of the arm section 220 as described above, the positional relationship between the arm section 220 and the piping section 10 and the wiring section 11 can be maintained within a predetermined range while sufficiently allowing the movement of the arm section 220. Although FIG. 1 illustrates a configuration where the piping section 10 and the wiring section 11 are routed through the same path, the paths through which the piping section 10 and the wiring section 11 are routed may be partially different from each other. The positions where the piping section 10 and the wiring section 11 are fixed can be changed as needed according to other device configurations and the operation of the robot 2.

The controller 5 is a robot controller that controls the drive of the robot 2. Hereinafter, an electrical configuration of the three-dimensional object printer 1 will be described with reference to FIG. 2, including a detailed description of the controller 5.

1-2. Electrical Configuration of Three-Dimensional Object Printer

Figure 2:
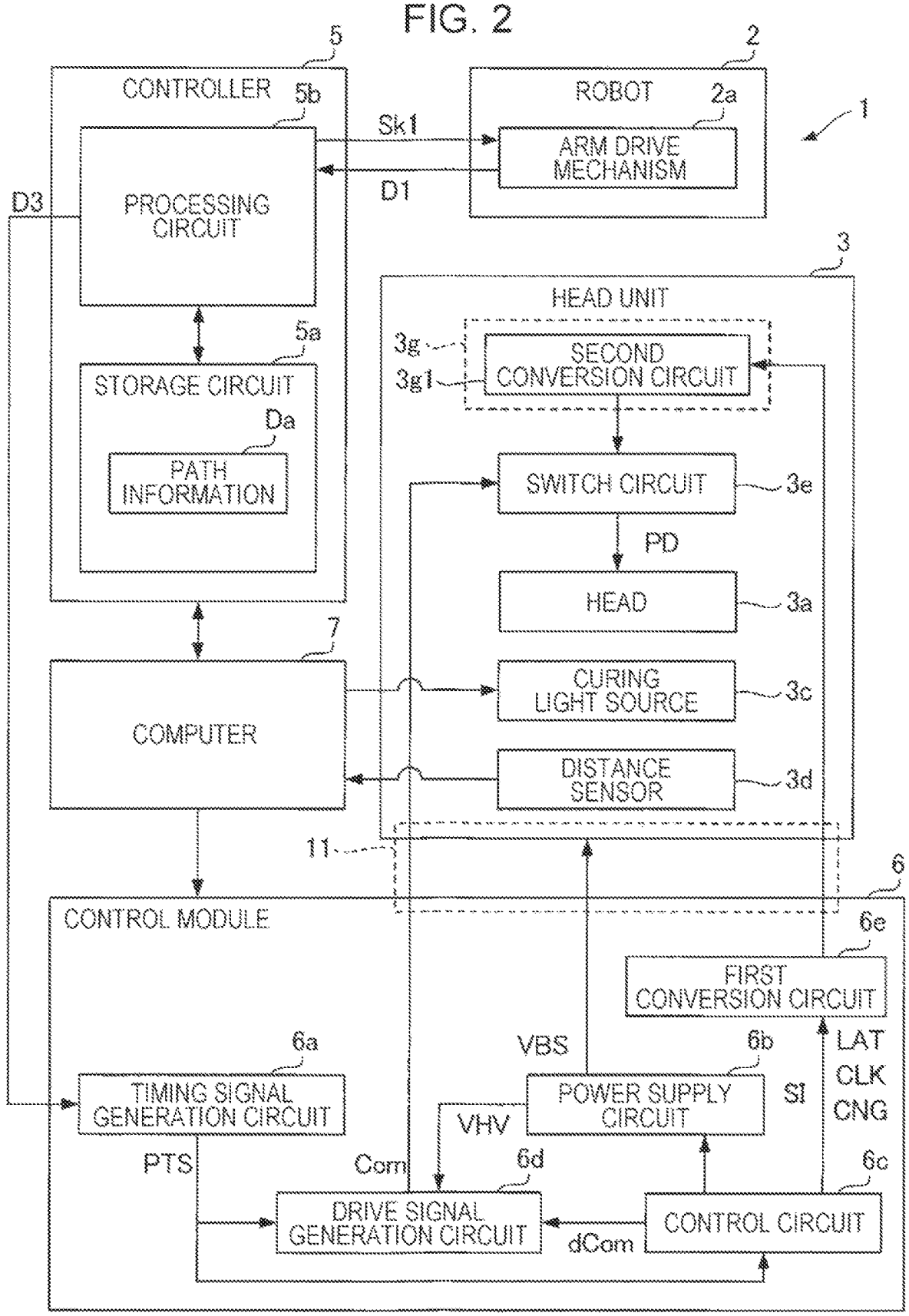
FIG. 2 is a block diagram illustrating an electrical configuration of the three-dimensional object printer according to the embodiment.

FIG. 2 is a block diagram illustrating an electrical configuration of the three-dimensional object printer 1 according to the embodiment. FIG. 2 illustrates components among the components of the three-dimensional object printer 1. As illustrated in FIG. 2, the three-dimensional object printer 1 includes, in addition to the components illustrated in FIG. 1 described above, a control module 6 communicably coupled to the controller 5 and a computer 7 communicably coupled to the controller 5 and to the control module 6. Hereinafter, prior to the detailed description of the controller 5, the control module 6 and the computer 7 will be described in order.

Each of the electrical components illustrated in FIG. 2 may be appropriately divided, may be partially included in other components, or may be integrally configured with other components. For example, a part or all of the functions of the controller 5 or the control module 6 may be realized by the computer 7, or may be realized by another external device such as a personal computer (PC) coupled to the controller 5 via a network such as a local area network (LAN) or the Internet.

The controller 5 has a function to control the drive of the robot 2 and a function to generate a signal D3 for synchronizing an ink discharge operation in the head unit 3 with the operation of the robot 2.

The controller 5 includes a storage circuit 5a and a processing circuit 5b.

The storage circuit 5a stores various programs to be executed by the processing circuit 5b and various data to be processed by the processing circuit 5b. The storage circuit 5a includes, for example, one or both of semiconductor memories including a volatile memory such as a random access memory (RAM) and a non-volatile memory such as a read only memory (ROM), an electrically erasable programmable read-only memory (EEPROM), or a programmable ROM (PROM). A part or all of the storage circuit 5a may be included in the processing circuit 5b.

The storage circuit 5a stores path information Da. The path information Da is information indicating a path to be taken by the head unit 3 and the posture of the head unit 3 on the path. The path information Da is determined based on, for example, the shape of the workpiece W, and is expressed using the coordinate values of the base coordinate system or the world coordinate system. The shape of the workpiece W is obtained, for example, by CAD (computer-aided design) data indicating the three-dimensional shape of the workpiece W. Such path information Da is inputted from the computer 7 to the storage circuit 5a.

The processing circuit 5b controls the operation of the arm drive mechanism 2a of the robot 2 based on the path information Da, and also generates the signal D3. The processing circuit 5b includes, for example, one or more processors such as a central processing unit (CPU). The processing circuit 5b may include a programmable logic device such as a field-programmable gate array (FPGA) in place of or in addition to the CPU.

The arm drive mechanism 2a is an assembly of the drive mechanisms of the joint sections 230_1 to 230_6 described above and includes, for each joint section, a motor for driving the joint section of the robot 2 and an encoder that detects a rotation angle of the joint section of the robot 2.

The processing circuit 5b performs inverse kinematics calculation, which is a calculation for converting the path information Da into a movement amount such as a rotation angle and a rotation speed of each joint of the robot 2. The processing circuit 5b outputs a control signal Sk1 based on an output D1 from each encoder of the arm drive mechanism 2a so that the actual movement amount such as the rotation angle and rotation speed of each joint is obtained as a result of the calculation described above based on the path information Da. The control signal Sk1 controls the drive of the motor of the arm drive mechanism 2a. The control signal Sk1 is corrected by the processing circuit 5b based on the output from the distance sensor 3d, when necessary.

The processing circuit 5b also generates the signal D3 based on the output D1 from at least one of the plurality of encoders of the arm drive mechanism 2a. For example, the processing circuit 5b generates, as the signal D3, a trigger signal including a pulse at a timing when the output D1 from one of the plurality of encoders takes a predetermined value.

The control module 6 is a circuit that controls ink discharge operation in the head unit 3 based on the signal D3 outputted from the controller 5 and on the print data from the computer 7. The control module 6 includes a timing signal generation circuit 6a, a power supply circuit 6b, a control circuit 6c, a drive signal generation circuit 6d as an example of a "drive circuit", and a first conversion circuit 6e as an example of a "conversion circuit".

The timing signal generation circuit 6a generates a timing signal PTS based on the signal D3. The timing signal generation circuit 6a includes a timer that starts generation of a timing signal PTS when the signal D3 is detected, for example.

The power supply circuit 6b receives power from a commercial power source (not shown) and generates various predetermined potentials under control of the control circuit 6c. The various potentials generated are appropriately supplied to each part of the control module 6 and the head unit 3. For example, the power supply circuit 6b generates a power supply potential VHV and an offset potential VBS. The offset potential VBS is an example of "reference potential" and supplied to the head unit 3. The power supply potential VHV is supplied to the drive signal generation circuit 6d.

The control circuit 6c generates, based on the timing signal PTS, a control signal SI, a waveform designation signal dCom, a latch signal LAT, a clock signal CLK, and a change signal CNG. These signals are synchronized with the timing signal PTS. Among these signals, the waveform designation signal dCom is inputted to the drive signal generation circuit 6d, and the other signals are inputted to the switch circuit 3e in the head unit 3 via the first conversion circuit 6e.

The control signal SI is a digital signal for specifying an operating state of a drive element included in the head 3a of the head unit 3. To be more specific, the control signal SI specifies whether to supply a drive signal Com to be described later to the drive element. This specification determines, for example, whether to discharge ink from a nozzle corresponding to the drive element and also determines the amount of ink discharged from the nozzle. The waveform designation signal dCom is a digital signal for specifying the waveform of the drive signal Com. The latch signal LAT and the change signal CNG are used in combination with the control signal SI, and the drive timing of the drive element is defined to specify the ink discharge timing from the nozzle. The clock signal CLK is a reference clock signal synchronized with the timing signal PTS.

The control circuit 6c described above includes, for example, one or more processors such as a central processing unit (CPU). The control circuit 6c may include a programmable logic device such as a field-programmable gate array (FPGA) in place of or in addition to the CPU.

The drive signal generation circuit 6d is a circuit that generates a drive signal Com for driving each drive element included in the head 3a of the head unit 3. To be more specific, the drive signal generation circuit 6d has a DA conversion circuit and an amplifier circuit, for example. In the drive signal generation circuit 6d, the DA conversion circuit converts the waveform designation signal dCom from the control circuit 6c from a digital signal to an analog signal, and the amplifier circuit uses the power supply potential VHV from the power supply circuit 6b to amplify the analog signal. Thus, the drive signal Com is generated. Among the waveforms included in the drive signal Com, a signal having the waveform actually supplied to the drive element is a drive pulse PD. The drive pulse PD is supplied to the drive element from the drive signal generation circuit 6d via the switch circuit 3e provided in the head unit 3.

The switch circuit 3e is a circuit that switches, based on the control signal SI, whether to supply at least a part of the waveform included in the drive signal Com as the drive pulse PD. The control signal SI from the control circuit 6c is inputted to the switch circuit 3e through the first conversion circuit 6e and a second conversion circuit 3g1.

The first conversion circuit 6e is a serializer that converts the control signal SI, a latch signal LAT, a clock signal CLK, and a change signal CNG from the control circuit 6c from single-ended signals to differential signals. In this conversion, the control signal SI, the latch signal LAT, the clock signal CLK, and the change signal CNG are multiplexed. The differential signal is inputted from the first conversion circuit 6e to the second conversion circuit 3g1 through the wiring section 11. The first conversion circuit 6e includes an integrated circuit (IC) chip mounted on a substrate included in the control module 6, for example.

The second conversion circuit 3g1 is a deserializer as an example of a "conversion circuit" that is provided on a relay board 3g arranged in the head unit 3, and that converts a differential signal from the first conversion circuit 6e into a single-ended signal. Therefore, the second conversion circuit 3g1 outputs each of the control signal SI, the latch signal LAT, the clock signal CLK, and the change signal CNG as a single-ended signal. The control signal SI, the latch signal LAT, the clock signal CLK, and the change signal CNG from the second conversion circuit 3g1 are inputted to the switch circuit 3e, respectively. The second conversion circuit 3g1 includes an IC chip mounted on the relay board 3g, for example. The relay board 3g will be described in detail with reference to FIG. 4 to be described later.

The computer 7 has a function to supply information such as path information Da to the controller 5 and a function to supply information such as print data to the control module 6. In addition to these functions, the computer 7 of this embodiment also has a function to control the drive of the curing light source 3c and a function to input information based on a measurement result from the distance sensor 3d to the controller 5. The computer 7 is, for example, a desktop computer or a notebook computer having a program installed to realize these functions. The curing light source 3c may be controlled by the controller 5. The measurement result from the distance sensor 3d may be inputted directly to the controller 5.

1-3. Head Unit Configuration

Figure 3:
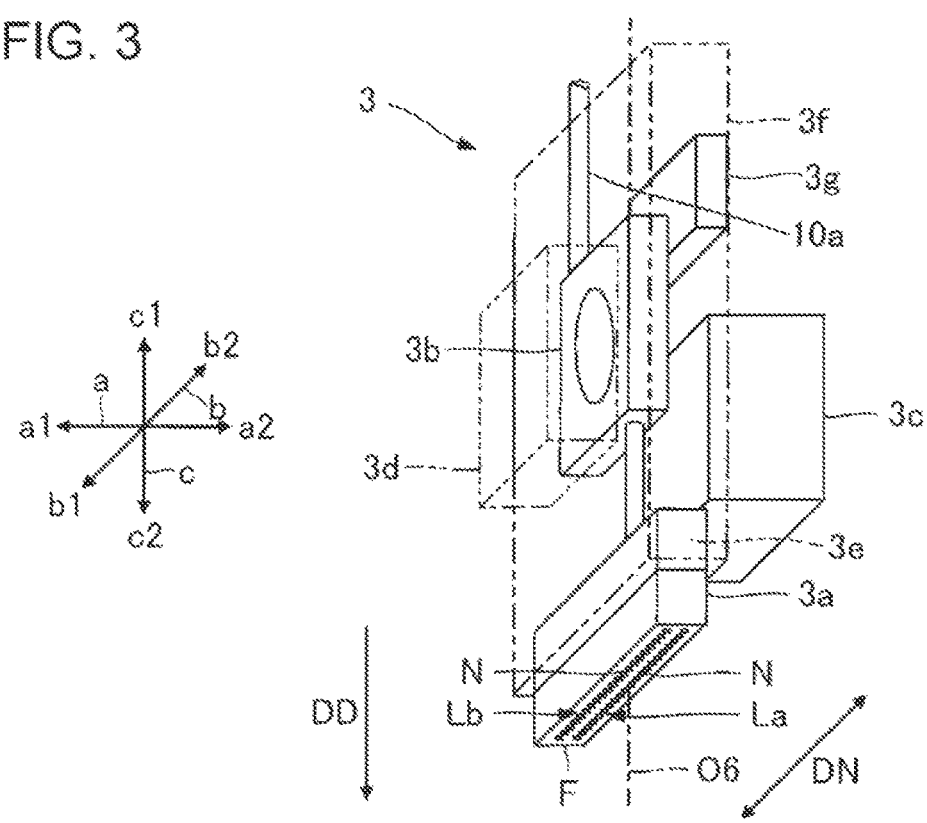
FIG. 3 is a perspective view illustrating a schematic configuration of a head unit.

FIG. 3 is a perspective view illustrating a schematic configuration of the head unit 3. For convenience, the following description will be given appropriately using an a-axis, a b-axis and a c-axis that intersect with each other. In the following description, one direction along the a-axis is an a1 direction, and a direction opposite to the a1 direction is an a2 direction. Likewise, directions opposite to each other along the b-axis are a b1 direction and a b2 direction. Also, directions opposite to each other along the c-axis are a c1 direction and a c2 direction.

The a-axis, the b-axis, and the c-axis correspond to coordinate axes of a tool coordinate system set in the head unit 3. The relationships between positions and postures change relative to the world coordinate system or robot coordinate system described above according to the operation of the robot 2 described above. In the example illustrated in FIG. 3, the c-axis is parallel to the rotation axis O6 described above. The a-axis, b-axis, and c-axis are typically orthogonal to each other, but the present disclosure is not limited thereto and the axes may intersect at an angle within a range from 80° to 100°, for example. The tool coordinate system and the base coordinate system or the robot coordinate system are associated with each other by calibration. The tool coordinate system is set so that the center of a nozzle surface F to be described later serves as a reference (tool center point), for example.

As illustrated in FIG. 3, the head unit 3 includes the relay board 3g, besides the above-described head 3a, pressure regulating valve 3b, curing light source 3c, and distance sensor 3d illustrated in FIG. 1. These are supported by a support 3f indicated by the chain double-dashed line in FIG. 3. In the example illustrated in FIG. 3, the head unit 3 includes one head 3a and one pressure regulating valve 3b. However, the present disclosure is not limited to the example illustrated in FIG. 3, and the head unit 3 may include two or more heads and valves. Also, the installation position of the pressure regulating valve 3b is not limited to the arm 226, but may be another arm, for example, or the like, or may be a fixed position with respect to the base section 210.

The support 3f is made of a metal material, for example, and is a substantially rigid body. In FIG. 3, the support 3f has a flat box shape, but the shape of the support 3f is not particularly limited and is optionally selected.

The support 3f is attached to the arm 226 described above. Therefore, the head 3a, the pressure regulating valve 3b, the curing light source 3c, the distance sensor 3d, and the relay board 3g are collectively supported on the arm 226 by the support 3f. Thus, the relative positions of the head 3a, the pressure regulating valve 3b, the curing light source 3c, the distance sensor 3d, and the relay board 3g with respect to the arm 226 are fixed. In the example illustrated in FIG. 3, the pressure regulating valve 3b is arranged at a position in the c1 direction with respect to the head 3a. The curing light source 3c is arranged at a position in the a2 direction with respect to the head 3a. The distance sensor 3d and the relay board 3g are arranged at a position in the a1 direction with respect to the head 3a.

The head 3a has a nozzle surface F and a plurality of nozzles N that open to the nozzle surface F. In the example illustrated in FIG. 3, each nozzle N discharges ink in a discharge direction DD which is the c2 direction. A normal direction of the nozzle surface F is the c2 direction, and the plurality of nozzles N are divided into a nozzle array La and a nozzle array Lb, which are arranged with a space therebetween in a direction along the a-axis. Each of the nozzle arrays La and Lb is a set of the plurality of nozzles N linearly arranged in a nozzle array direction DN along the b-axis. In the head 3a, the elements related to the nozzles N in the nozzle array La and the elements related to the nozzles N in the nozzle array Lb are configured to be substantially symmetrical to each other in the direction along the a-axis.

However, positions of the plurality of nozzles N in the nozzle array La and positions of the plurality of nozzles N in the nozzle array Lb may correspond to each other or may be different from each other in the direction along the b-axis. Also, the elements related to the nozzles N in one of the nozzle arrays La and Lb may be omitted. The following description is given of a configuration where the positions of the plurality of nozzles N in the nozzle array La and the positions of the plurality of nozzles N in the nozzle array Lb correspond to each other in the direction along the b-axis.

Although not illustrated, the head 3a has, for each nozzle N, a piezoelectric element as a drive element and a cavity for accommodating ink. The piezoelectric element causes ink to be discharged from the nozzle corresponding to the cavity by changing the pressure in the cavity corresponding to the piezoelectric element. Such a head 3a may be obtained, for example, by attaching a plurality of substrates such as a silicon substrate appropriately processed by etching or the like with an adhesive or the like. As the drive element for discharging ink from the nozzles, a heater that heats the ink inside the cavity may be used instead of the piezoelectric element.

As described above, ink is supplied to the head 3a from an ink tank (not shown) via the supply pipe 10a. The supply pipe 10a and the head 3a are coupled each other via the pressure regulating valve 3b.

The pressure regulating valve 3b is a valve mechanism that opens and closes according to the pressure of the ink in the head 3a. This opening and closing maintains the pressure of the ink in the head 3a at a negative pressure within a predetermined range even when the positional relationship between the head 3a and the ink tank (not shown) described above changes. Therefore, the meniscus of the ink formed in the nozzle N of the head 3a is stabilized. As a result, it is possible to prevent air bubbles from entering the nozzle N and the ink from overflowing from the nozzle N. The ink from the pressure regulating valve 3b is appropriately distributed to a plurality of locations in the head 3a via branch flow paths (not shown). The ink from the ink tank (not shown) is transferred into the supply pipe 10a at a predetermined pressure by a pump or the like.

The curing light source 3c emits energy such as light, heat, electron beams, or radiation for curing or solidifying the ink on the workpiece W. For example, when the ink is ultraviolet curable, the curing light source 3c includes a light emitting element such as a light emitting diode (LED) that emits ultraviolet rays. The curing light source 3c may appropriately include an optical component such as a lens for adjusting an emission direction or emission range of energy.

The curing light source 3c does not have to completely cure or completely solidify the ink on the workpiece W. In this case, for example, the ink irradiated with energy from the curing light source 3c may be completely cured or completely solidified by energy from a curing light source separately installed on the installation surface of the base section 210 of the robot 2. The curing light source 3c may be provided as needed and may be omitted.

The distance sensor 3d is an optical displacement sensor that measures a distance between the head 3a and the workpiece W. The distance sensor 3d of this embodiment outputs a signal according to the distance between the head 3a and the workpiece W in the direction along the c-axis. The distance sensor 3d may be provided as needed or may be omitted.

The relay board 3g is a circuit board such as a rigid board or a rigid flexible board on which the second conversion circuit 3g1 described above is provided, and relays a signal transmitted from the control module 6 to the head 3a. Hereinafter, the relay board 3g will be described with reference to FIG. 4.

Figure 4:
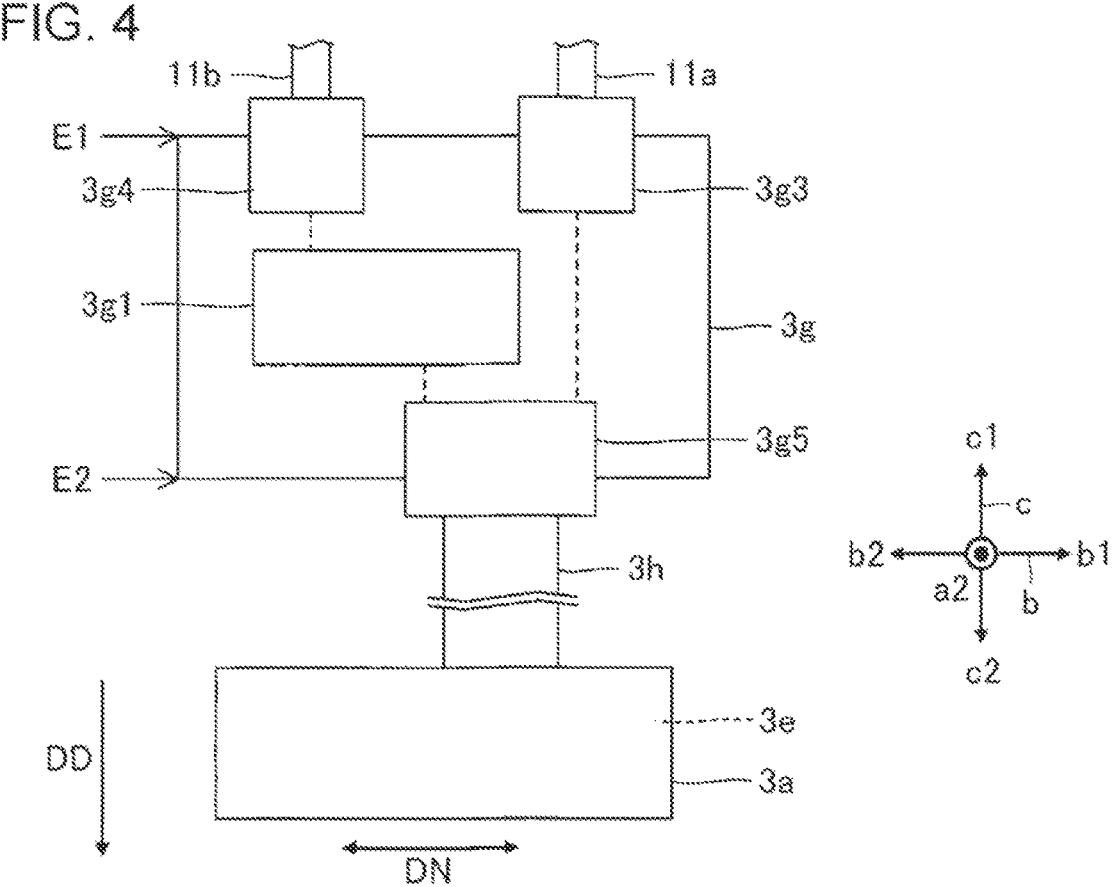
FIG. 4 is a schematic view for explaining a relay board.

FIG. 4 is a schematic view for explaining the relay board 3g. As illustrated in FIG. 4, the relay board 3g is arranged along a plane defined by the b-axis and the c-axis. In the example illustrated in FIG. 4, the relay board 3g has a rectangular shape in plan view and has two sides E1 and E2 parallel to the b-axis. The side E1 is an example of a "first side", and the side E2 is an example of a "second side" different from the side E1. In this embodiment, the sides E1 and E2 are parallel to each other.

On the relay board 3g, a first connector 3g3, a second connector 3g4, and a third connector 3g5 are mounted, besides the second conversion circuit 3g1 described above. In the example illustrated in FIG. 4, the second conversion circuit 3g1 is mounted in the center of the relay board 3g, and these connectors are arranged around the second conversion circuit 3g1.

The first connector 3g3 is a connector to which a first cable 11a is coupled, and is electrically coupled to the third connector 3g5. In the example illustrated in FIG. 4, the first connector 3g3 is arranged along the side E1 of the relay board 3g. The first connector 3g3 is coupled to one end of the first cable 11a facing in the c2 direction.

The first cable 11a coupled to the first connector 3g3 described above is a cable having a conductor for transmitting a drive signal Com from the control module 6. Therefore, the drive signal Com from the first cable 11a is inputted to the third connector 3g5 through the first connector 3g3. The first cable 11a has a conductor for supplying an offset potential VBS, besides the conductor for transmitting the drive signal Com. A specific example of the first cable 11a will be described with reference to FIG. 5 to be described later.

The second connector 3g4 is a connector to which a second cable 11b is coupled, and is electrically coupled to the second conversion circuit 3g1. In the example illustrated in FIG. 4, the second connector 3g4 is arranged along the side E1 of the relay board 3g. That is, the second connector 3g4 is arranged along the side E1 of the relay board 3g together with the first connector 3g3, and is adjacent to the first connector 3g3. The second connector 3g4 is coupled to one end of the second cable 11b facing in the c2 direction. That is, the direction in which the second connector 3g4 faces is the same as the direction in which the first connector 3g3 faces. In this embodiment, a local area network (LAN) connector is used as the second connector 3g4, but the present disclosure is not limited thereto.

The second cable 11b coupled to the second connector 3g4 described above is a cable having a conductor for transmitting a control signal SI or the like as a differential signal from the control module 6. Therefore, the control signal SI and the like from the second cable 11b are inputted to the second conversion circuit 3g1 through the second connector 3g4. A latch signal LAT, a clock signal CLK, and a change signal CNG, besides the control signal SI, are transmitted in a multiplexed state as a differential signal to the second cable 11b. As this differential signal transmission system, low voltage differential signaling (LVDS) is used in this embodiment. A specific example of the second cable 11b will be described with reference to FIG. 5 to be described later.

The third connector 3g5 is a connector to which the third cable 3h is coupled, and is electrically coupled to the second conversion circuit 3g1, besides the first connector 3g3. In the example illustrated in FIG. 4, the third connector 3g5 is arranged along the side E2 of the relay board 3g. That is, the third connector 3g5 is arranged along the side different from the side along which the first connector 3g3 and the second connector 3g4 are arranged among the plurality of sides of the relay board 3g. The third connector 3g5 is coupled to one end of the third cable 3h facing in the c1 direction. That is, the direction in which the third connector 3g5 faces is opposite from the direction in which the first connector 3g3 and the second connector 3g4 face. The third connector 3g5 may be omitted. When the third connector 3g5 is omitted, the third cable 3h may be coupled as a flexible wiring board to the relay board 3g with a conductive adhesive, or may be configured as a flexible portion of the rigid flexible board integrally formed with the relay board 3g.

The third cable 3h coupled to the third connector 3g5 described above electrically couples the relay board 3g to the head 3a. The third cable 3h transmits signals such as the control signal SI and the drive signal Com from the relay board 3g to the head 3a. More specifically, the third cable 3h includes a plurality of conductors for the control signal SI, the latch signal LAT, the clock signal CLK, and the change signal CNG from the second conversion circuit 3g1, and includes a plurality of conductors for the drive signal Com and the offset potential VBS from the first connector 3g3. As the third cable 3h, a flexible flat cable is preferably used, for example, from the viewpoint of easy coupling to the head 3a, and the like.

The plurality of components mounted on the relay board 3g may be mounted on only one surface of the relay board 3g, or some components may be mounted on one surface of the relay board 3g and other components may be mounted on the other surface thereof. That is, the relay board 3g may be a single-sided board or a double-sided board. One or both of the first connector 3g3 and the second connector 3g4 may be arranged so as to face in the thickness direction of the relay board 3g. However, in this case, it is preferable from the viewpoint of aligning the directions, in which the first connector 3g3 and the second connector 3g4 face, that both of the directions in which the first connector 3g3 and the second connector 3g4 face are set in the thickness direction of the relay board 3g. The third connector 3g5 may also be arranged so as to face in the thickness direction of the relay board 3g. However, in this case, it is preferable, from the viewpoint of making the third connector 3g5 face in a different direction from the direction in which the first connector 3g3 and the second connector 3g4 face, that the third connector 3g5 is mounted on one of the surfaces of the relay board 3g, that is different from the surface on which the first connector 3g3 and the second connector 3g4 are mounted, or that the direction in which the first connector 3g3 and the second connector 3g4 face is set in a direction along the surface of the relay board 3g.

Figure 5:
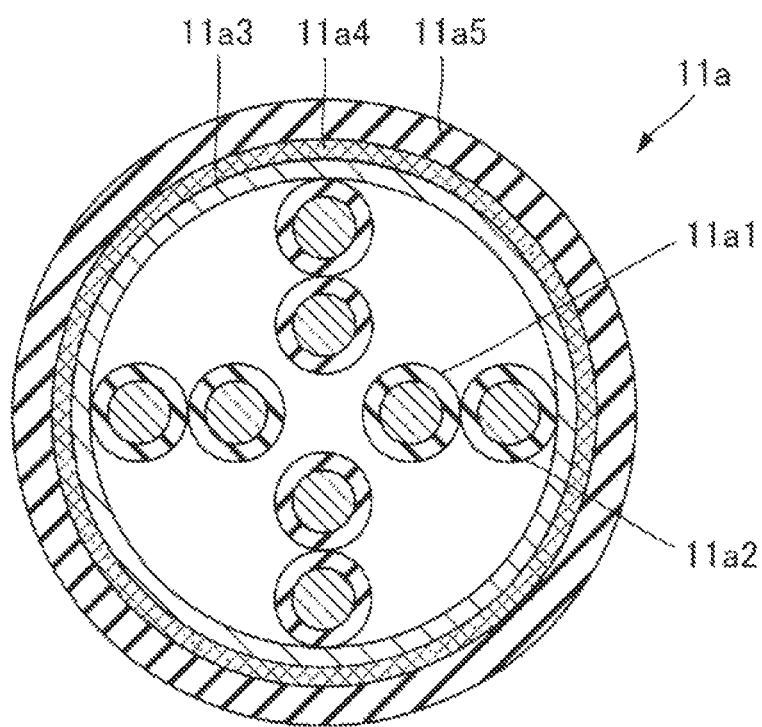
FIG. 5 is a sectional view of a wiring section including a first cable and a second cable.

The wiring section 11 includes the first cable 11a and the second cable 11b. First, the first cable will be described. FIG. 5 is a sectional view of the first cable 11a. As illustrated in FIG. 5, the first cable 11a is a multicore cable having four sets of twisted pair cables.

The first cable 11a includes a press winding 11a3 that collectively covers the four sets of twisted pair cables, a shielding layer 11a4 that covers the outer peripheral surface of the press winding 11a3, and a jacket 11a5 that covers the outer peripheral surface of the shielding layer 11a4.

Each of the conductors included in the first cable 11a is a single wire conductor, a stranded wire conductor or the like, that is made of soft copper wire, for example. These conductors are plated with tin, silver, nickel or the like, as needed. The outer peripheral surfaces of the two conductors are covered with jackets made of resin such as polyethylene resin or elastomer, for example.

The first cable 11a has a conductor 11a1 and a conductor 11a2, which are stranded together as one of the twisted pair cables. A drive signal Com is transmitted to one conductor 11a1 of the two conductors 11a1 and 11a2, and an offset potential VBS is supplied to the other conductor 11a2. Thus, by using the two conductors constituting the twisted pair cable for the transmission of the drive signal Com and the offset potential VBS, even when noise is mixed in the two signals, a difference in the noise mixed in the two signals can be reduced. That is, substantially the same noise is mixed in the drive signal Com and the offset potential VBS.

The conductor pair other than the conductors 11a1 and 11a2 can also be used to supply a drive signal Com and an offset potential VBS of another system, and can also be used to supply other signals as needed.

The four sets of twisted pair cables included in the first cable 11a described above are collectively covered with the press winding 11a3. The press winding 11a3 has a function of making the outer shape of the cross section of the first cable 11a closer to a circle, and is configured, for example, by winding a polypropylene tape or the like around the outer periphery of the assembly of the four sets of twisted pair cables.

The shielding layer 11a4 is an electromagnetic shield, and is configured, for example, by winding a metal foil laminated tape around the outer periphery of the press winding 11a3, the tape being obtained by laminating a metal foil such as aluminum on one side or both sides of a plastic tape such as polyester tape.

The jacket 11a5 is made of, for example, vinyl chloride resin, polyethylene resin, or a flame-resistant resin obtained by adding a flame retardant such as magnesium hydroxide to a resin such as polyethylene resin.

In the example illustrated in FIG. 5, the number of twisted pair cables included in the first cable 11a is four, but the number is not limited thereto and may be two or three, or may be five or more.

Next, the second cable will be described. The second cable 11b is provided as a cable different from the first cable 11a. The first cable 11a transmits an analog signal, while the second cable 11b transmits a digital signal. It is preferable that the second cable 11b also includes a twisted pair cable as in the first cable 11a. In this embodiment, a local area network (LAN) cable is used as the second cable 11b.

As described above, the wiring section 11 includes the first cable 11a and the second cable 11b. The first cable 11a and the second cable 11b are bundled by a spiral tube, a binding band, or the like so as to be appropriately routed along the arm section 220 of the robot 2. The wiring section 11 may include a cable other than the twisted pair cable. In this embodiment, different cables are used for the first cable 11a and the second cable 11b due to a difference in signal system. However, these cables can also be bundled into one cable by using a multicore cable or the like, for example. In this case, one cable includes a plurality of cores or a plurality of conductors, and these cores or conductors have the functions of the first cable 11a and the second cable 11b, respectively.

As described above, the three-dimensional object printer 1 includes the head 3a, the robot 2 as an example of the "movement mechanism", the drive signal generation circuit 6d as an example of the "drive circuit", the control circuit 6c, the first cable 11a, and the second cable 11b.

The head 3a has the plurality of nozzles N that discharge ink as an example of the "liquid". The robot 2 has the arm section 220 that supports the head 3a and the plurality of joint sections 230 provided on the arm section 220. The drive signal generation circuit 6d generates a drive signal Com to drive the head 3a. The control circuit 6c generates a control signal SI to control the supply of the drive signal Com to the head 3a. The first cable 11a is a cable for transmitting the drive signal Com from the drive signal generation circuit 6d to the head 3a. The second cable 11b is a cable for transmitting the control signal SI from the control circuit 6c to the head 3a. At least a part of the second cable 11b is arranged along the arm section 220. Also, the control signal SI is transmitted as a differential signal to the second cable 11b.

In the three-dimensional object printer 1 described above, since the control signal SI is transmitted as the differential signal to the second cable 11b, the control signal SI can be serially transmitted. Therefore, the number of conductors included in the second cable 11b can be reduced as compared with a configuration in which the control signal SI is parallel-transmitted. As a result, it becomes easier to route the second cable 11b along the arm section 220 as compared with the related art, thus reducing the risk of a break of the second cable 11b. Since the differential signal is less susceptible to noise than the single-ended signal, influence of noise from a noise source in the arm section 220 on the control signal SI can be reduced even when the second cable 11b is arranged along the arm section 220. As a result, the image quality can be improved by stabilizing the drive of the head 3a.

The three-dimensional object printer 1 further includes the relay board 3g as described above. The relay board 3g is provided with the second conversion circuit 3g1 as an example of the "conversion circuit" that converts the differential signal into a single-ended signal. The second cable 11b is electrically coupled to the head 3a through the second conversion circuit 3g1. Therefore, the control signal SI can be inputted to the head 3a as the single-ended signal.

As described above, the relay board 3g has the first connector 3g3 coupled to the first cable 11a and the second connector 3g4 coupled to the second cable 11b. The relay board 3g has the side E1 as an example of the "first side" in plan view, and the first connector 3g3 and the second connector 3g4 are arranged along the side E1. Therefore, the first cable 11a and the second cable 11b can be more easily bundled as compared with a configuration in which the first connector 3g3 and the second connector 3g4 are arranged along the different sides of the relay board 3g.

It is preferable that no other components are mounted between the first connector 3g3 and the second connector 3g4 on the relay board 3g. With this, the first cable 11a and the second cable 11b can be more easily bundled as compared with a configuration in which there are other members between the first connector 3g3 and the second connector 3g4.

In this embodiment, as described above, the first connector 3g3 and the second connector 3g4 face in the same direction. Therefore, the first cable 11a and the second cable 11b can be more easily bundled as compared with a configuration in which the first connector 3g3 and the second connector 3g4 face in directions different from each other.

The three-dimensional object printer 1 further includes the third cable 3h as described above. The third cable 3h transmits the drive signal Com and the control signal SI to the head 3a from the relay board 3g coupled to the first cable 11a and the second cable 11b. The sum of the number of conductors included in the first cable 11a and the number of conductors included in the second cable 11b is preferably smaller than the number of conductors included in the third cable 3h. Therefore, since the second cable 11b can be more easily routed along the arm section 220, the risk of a break of the second cable 11b can be reduced. Since the second cable 11b can more easily follow the movement of the arm section 220, there is also an advantage that the second cable 11b is less likely to interfere with the printing operation by the robot 2. The use of the differential signal described above makes it possible to set the sum of the number of conductors included in the first cable 11a and the number of conductors included in the second cable 11b to be smaller than the number of conductors included in the third cable 3h.

The three-dimensional object printer 1 further includes the support 3f as described above. The support 3f fixes the positional relationship between the relay board 3g and the head 3a. The relay board 3g and the head 3a are supported by the arm section 220 via the support 3f. Therefore, the third cable 3h is not substantially deformed by the movement of the arm section 220. As a result, even when many conductors are included in the third cable 3h, a break of the third cable 3h is suitably prevented.

As described above, the relay board 3g further includes the third connector 3g5 coupled to the third cable 3h. The relay board 3g further has the side E2 as an example of the "second side" different from the side E1 in plan view, and the third connector 3g5 is arranged along the side E2. Therefore, the first cable 11a, the second cable 11b, and the third cable 3h can be efficiently arranged. There is also an advantage that the relay board 3g can be more easily reduced in size as compared with a configuration in which all of the first connector 3g3, the second connector 3g4, and the third connector 3g5 are arranged along the same side of the relay board 3g.

As described above, the third connector 3g5 faces in a direction different from the direction in which the first connector 3g3 and the second connector 3g4 face. Therefore, twisting of the first cable 11a, the second cable 11b, and the third cable 3h can be reduced as compared with a configuration in which the third connector 3g5 faces in the same direction as the direction in which the first connector 3g3 and the second connector 3g4 face. As a result, the risk of a break of these cables can be reduced, and the structure around the head 3a can be reduced in size.

In this embodiment, as described above, the sides E1 and E2 are the two sides of the relay board 3g, which are located opposite from each other. Therefore, the first cable 11a, the second cable 11b, the relay board 3g, and the third cable 3h can be arranged in this order.

In particular, the side E2 is located at a position closer to the discharge direction DD of ink from the head 3a than the side E1. Therefore, the relay board 3g and the third cable 3h can be arranged in this order from the first cable 11a and the second cable 11b toward the head 3a. As a result, the structure around the head 3a can be reduced in size.

As described above, the third connector 3g5 faces in a direction opposite from the direction in which the first connector 3g3 and the second connector 3g4 face. Therefore, the third cable 3h can be arranged along the extension of the first cable 11a and the second cable 11b.

As described above, the third cable 3h is the flexible flat cable. Therefore, the third cable 3h can be easily routed around the head 3a. There is also an advantage that the head 3a and its surrounding structure can be easily reduced in size.

As described above, the first cable 11a includes the conductor 11a1 as an example of the "first conductor" and the conductor 11a2 as an example of the "second conductor". The conductor 11a1 transmits a drive signal Com. The conductor 11a2 is a conductor for supplying, to the head 3a, the offset potential VBS as an example of the "reference potential" for the drive signal Com. Therefore, the configuration of the three-dimensional object printer 1 can be simplified as compared with a configuration in which a cable for the offset potential VBS is separately provided.

As described above, the conductors 11a1 and 11a2 are stranded together. Therefore, the conductor 11a2 functions as an electromagnetic shield for the conductor 11a1, thus making it possible to reduce noise mixed in the drive signal Com. Even when noise is mixed in the drive signal Com, the same kind of noise as this noise is also mixed in the offset potential VBS. Therefore, the noise causes substantially no fluctuation in potential difference between the drive signal Com and the offset potential VBS. Therefore, by this potential difference to drive the head 3a, the head 3a can be stably driven without being substantially affected by the noise. The conductors 11a1 and 11a2 may be conductors included in a coaxial cable. In this case, also, by using the conductor 11a2 as an outer conductor of the coaxial cable, the conductor 11a2 functions as an electromagnetic shield for the conductor 11a1 as an inner conductor.

2. Modified Examples

The embodiment described above may be modified in various different ways. Specific modified examples that can be applied to the above embodiment will be illustrated below. It should be noted that two or more embodiments optionally selected from the following examples may be appropriately combined within a range that does not contradict each other.

2-1. Modified Example 1

Figure 6:
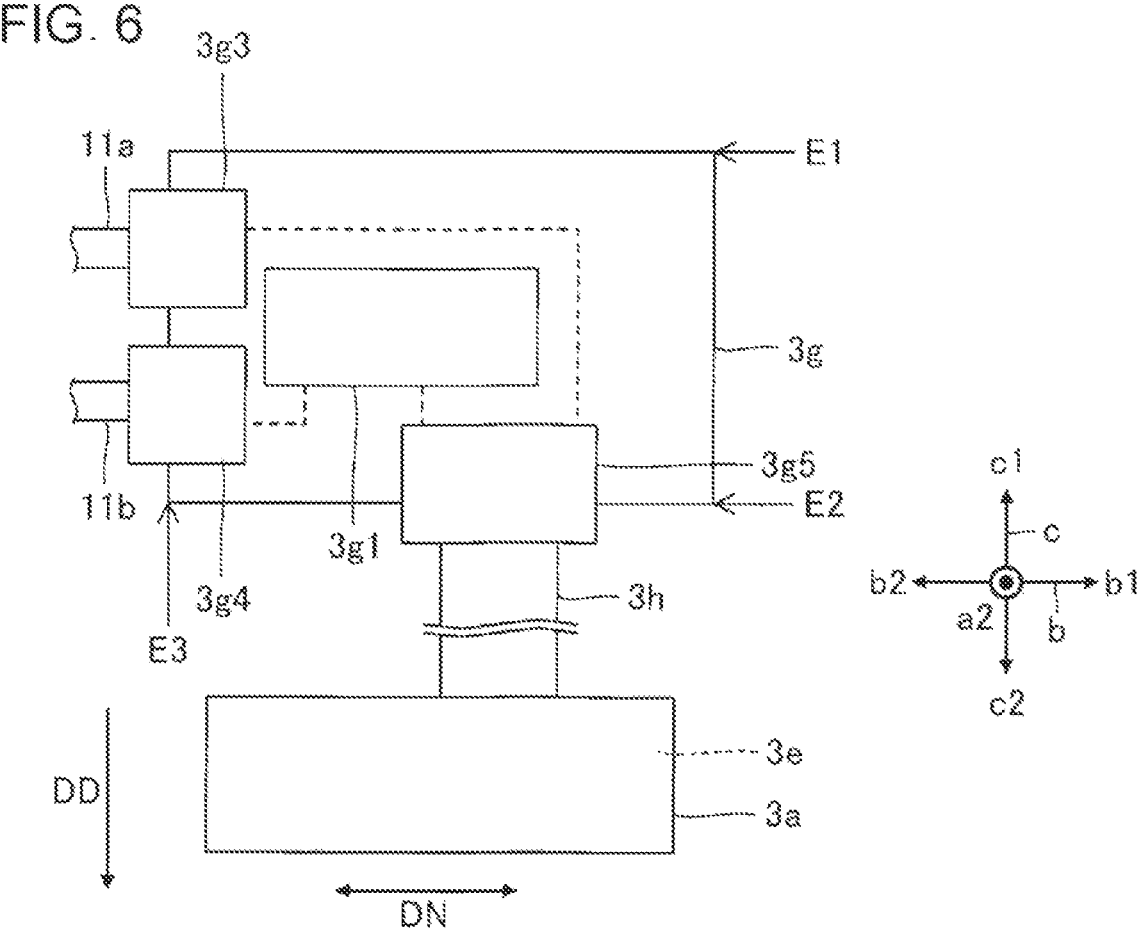
FIG. 6 is a schematic view for explaining a relay board according to modified example 1.

FIG. 6 is a schematic view for explaining a relay board 3g according to modified example 1. The relay board 3g illustrated in FIG. 6 is the same as the relay board 3g of the above embodiment except that a first connector 3g3 and a second connector 3g4 are arranged in a different manner. On the relay board 3g according to modified example 1, the first connector 3g3 and the second connector 3g4 are arranged along a side E3 of the relay board 3g. The side E3 is an example of a "second side" different from the side E1, and is a side coupling the sides E1 and E2 of the relay board 3g. Even when the first connector 3g3 and the second connector 3g4 are arranged in this way, the first cable 11a, the second cable 11b, and the third cable 3h can be efficiently arranged and the relay board 3g can be reduced in size as compared with the configuration in which all of the first connector 3g3, the second connector 3g4, and the third connector 3g5 are arranged along the same side of the relay board 3g.

2-2. Modified Example 2

In the above embodiment, the description is given of the configuration using the 6-axis vertical multiaxis robot as the robot. However, the present disclosure is not limited to such a configuration. The robot may be, for example, a vertical multiaxis robot other than the 6-axis robot, or a horizontal multiaxis robot. Also, the arm section of the robot may have a telescopic mechanism or the like, in addition to the joint section including the rotating mechanism. However, from the viewpoint of the balance between the printing quality in the printing operation and the degree of freedom of the robot movement in the non-printing operation, it is preferable that the robot is a multiaxis robot with six or more axes.

2-3. Modified Example 3

In the above embodiment, the description is given of the configuration using screwing or the like as a method of fixing the head to the robot. However, the present disclosure is not limited to such a configuration. For example, the head may be fixed to the robot by gripping the head with a gripping mechanism such as a hand mounted as an end effector of the robot.

2-4. Modified Example 4

Although the configuration in which printing is performed using one type of ink has been described in the above embodiment, the present disclosure is not limited thereto but may also be applied to a configuration in which printing is performed using two or more types of ink.

2-5. Modified Example 5

The use application of the three-dimensional object printer according to the present disclosure is not limited to printing. For example, a three-dimensional object printer that discharges a coloring material solution is used as a manufacturing device for forming a color filter of a liquid crystal display device. A three-dimensional object printer that discharges a conductive material solution is used as a manufacturing device for forming wiring and electrodes for a wiring substrate. Moreover, the three-dimensional object printer can be used as a jet dispenser for applying a liquid such as an adhesive onto a workpiece.

What is claimed is:

1. A three-dimensional object printer comprising:
   a head having a plurality of nozzles that discharge a liquid;
   a movement mechanism having an arm section that supports the head and having a plurality of joint sections provided at the arm section;
   a drive circuit that generates a drive signal to drive the head;
   a control circuit that generates a control signal to control supply of the drive signal to the head;
   a first cable for transmitting the drive signal from the drive circuit to the head;
   a second cable for transmitting the control signal from the control circuit to the head; and
   a relay board coupled to the first cable and the second cable, wherein
   at least a part of the second cable is arranged along the arm section, and
   the control signal is transmitted as a differential signal to the second cable.

2. The three-dimensional object printer according to claim 1, wherein
   the relay board is provided with a conversion circuit that converts the differential signal into a single-ended signal, wherein the second cable is electrically coupled to the head through the conversion circuit.

3. The three-dimensional object printer according to claim 2, wherein
the relay board includes:
a first connector coupled to the first cable; and
a second connector coupled to the second cable,
the relay board has a first side in a plan view, and
the first connector and the second connector are arranged along the first side.

4. The three-dimensional object printer according to claim 3, wherein
no other component is mounted between the first connector and the second connector on the relay board.

5. The three-dimensional object printer according to claim 3, wherein
the first connector and the second connector face in a same direction.

6. The three-dimensional object printer according to claim 3, further comprising:
a third cable for transmitting the drive signal and the control signal from the relay board to the head, wherein
the relay board further includes a third connector coupled to the third cable,
the relay board further has a second side different from the first side in the plan view, and
the third connector is arranged along the second side.

7. The three-dimensional object printer according to claim 6, wherein
the third connector faces in a direction different from a direction in which the first connector and the second connector face.

8. The three-dimensional object printer according to claim 6, wherein
the first side and the second side are two sides of the relay board, which are located opposite from each other.

9. The three-dimensional object printer according to claim 6, wherein
the second side is located at a position closer to a discharge direction of the liquid from the head than the first side.

10. The three-dimensional object printer according to claim 6, wherein
the third connector faces in a direction opposite from a direction in which the first connector and the second connector face.

11. The three-dimensional object printer according to claim 6, wherein
the third cable is a flexible flat cable.

12. The three-dimensional object printer according to claim 2, wherein
the control circuit generates a latch signal, a change signal, and a clock signal, and
the control signal, the latch signal, the change signal, and the clock signal are transmitted via the second cable as the differential signal, and are input to the conversion circuit.

13. The three-dimensional object printer according to claim 1, further comprising:
a third cable for transmitting the drive signal and the control signal from the relay board to the head, wherein
a sum of a number of conductors included in the first cable and a number of conductors included in the second cable is smaller than a number of conductors included in the third cable.

14. The three-dimensional object printer according to claim 13, further comprising:
a support that fixes a positional relationship between the relay board and the head, wherein
the relay board and the head are supported by the arm section via the support.

15. The three-dimensional object printer according to claim 1, wherein
the first cable includes a first conductor for transmitting the drive signal and a second conductor for supplying, to the head, a reference potential for the drive signal.

16. The three-dimensional object printer according to claim 15, wherein
the first conductor and the second conductor are stranded together.

17. The three-dimensional object printer according to claim 1, wherein
the control circuit generates a latch signal, a change signal, and a clock signal, and
the control signal, the latch signal, the change signal, and the clock signal are transmitted in a multiplexed state via the second cable.

18. A three-dimensional object printer comprising:
a head having a plurality of nozzles that discharge a liquid;
a movement mechanism having an arm section that supports the head and having a plurality of joint sections provided on the arm section;
a drive circuit that generates a drive signal to drive the head;
a control circuit that generates a control signal to control supply of the drive signal to the head;
a first cable for transmitting the drive signal from the drive circuit to the head;
a second cable for transmitting the control signal from the control circuit to the head;
a relay board coupled to the first cable and the second cable; and
a third cable for transmitting the drive signal and the control signal from the relay board to the head, wherein
the control signal is transmitted as a differential signal to the second cable, and
a sum of a number of conductors included in the first cable and a number of conductors included in the second cable is smaller than a number of conductors included in the third cable.

19. The three-dimensional object printer according to claim 18, wherein
the relay board includes:
a first connector coupled to the first cable; and
a second connector coupled to the second cable,
the relay board has a first side in a plan view, and
the first connector and the second connector are arranged along the first side.

* * * * *